United States Patent
Green

(10) Patent No.: US 6,543,395 B2
(45) Date of Patent: *Apr. 8, 2003

(54) BI-FUEL CONTROL SYSTEM AND RETROFIT ASSEMBLY FOR DIESEL ENGINES

(75) Inventor: Jason E. Green, Weston, FL (US)

(73) Assignee: Gas Technologies, Inc., Weston, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/878,761

(22) Filed: Jun. 11, 2001

(65) Prior Publication Data

US 2002/0007805 A1 Jan. 24, 2002

Related U.S. Application Data

(63) Continuation-in-part of application No. 09/170,700, filed on Oct. 13, 1998, now Pat. No. 6,250,260.

(51) Int. Cl.$^7$ .................................................. F02B 3/00
(52) U.S. Cl. .................... 123/27 GE; 123/526; 123/575
(58) Field of Search ........................... 123/27 GE, 525, 123/526, 575, 577, 578, 198 D, 198 DB, 481

(56) References Cited

U.S. PATENT DOCUMENTS

| | | | | |
|---|---|---|---|---|
| 4,442,665 A | * | 4/1984 | Fick et al. ..................... | 48/191 |
| 4,489,699 A | * | 12/1984 | Poehlman .................... | 123/525 |
| 4,527,516 A | * | 7/1985 | Foster ..................... | 123/27 GE |
| 4,603,674 A | * | 8/1986 | Tanaka .................... | 123/27 GE |
| 4,641,625 A | * | 2/1987 | Smith .................... | 123/27 GE |
| 4,708,094 A | * | 11/1987 | Helmich et al. ........ | 123/27 GE |
| 4,817,568 A | * | 4/1989 | Bedford .................... | 123/27 GE |
| 4,955,326 A | * | 9/1990 | Helmich .................... | 123/27 GE |
| 5,050,550 A | * | 9/1991 | Gao .......................... | 123/275 |
| 5,092,305 A | * | 3/1992 | King .......................... | 123/1 A |
| 5,224,457 A | * | 7/1993 | Arsenault et al. ....... | 123/27 GE |
| 5,355,854 A | * | 10/1994 | Aubee .................... | 123/27 GE |
| 5,370,097 A | * | 12/1994 | Davis .................... | 123/27 GE |
| 5,379,740 A | * | 1/1995 | Moore et al. ........... | 123/27 GE |
| 5,735,253 A | * | 4/1998 | Perotto et al. ......... | 123/406.47 |
| 5,937,800 A | * | 8/1999 | Brown et al. ........... | 123/27 GE |
| 6,101,986 A | * | 8/2000 | Brown et al. ........... | 123/27 GE |
| 6,250,260 B1 | * | 6/2001 | Green .................... | 123/27 GE |
| 6,289,881 B1 | * | 9/2001 | Klopp .................... | 123/406.32 |

* cited by examiner

Primary Examiner—Henry C. Yuen
Assistant Examiner—Hai H. Huynh
(74) Attorney, Agent, or Firm—Malloy & Malloy, P.A.

(57) ABSTRACT

A bi-fuel control system and assembly for modifying and operating a diesel engine to the extent that the engine is capable of running in either a full diesel fuel mode or a bi-fuel mode, where bi-fuel is defined as a mixture of a methane based gas and diesel fuel. The control system and assembly are designed to provide for either manual or automatic transfer between modes for continuous engine operation without interruption in output and at substantially equivalent efficiency levels. A gas control sub-system and sub-assembly are provided to control the amount of gas supplied to the diesel engine in the bi-fuel mode, and an electronic control sub-system and sub-assembly are provided to control the overall system and assembly based on engine load as determined from the intake manifold air pressure.

57 Claims, 2 Drawing Sheets

BI-FUEL CONTROL SYSTEM AND RETROFIT ASSEMBLY FOR DIESEL ENGINES

This is a continuation in part application of presently pending U.S. patent application Ser. No. 09/170,700 filed on Oct. 13, 1998, now U.S. Pat. No. 6,250,260 which is incorporated herein by reference.

BACKGROUND OF THE INVENTION

1. Field of the Invention

The present invention is directed to a system and an assembly, which includes operative components for implementing the system, wherein both the system and the assembly are structured and configured to modify and/or adapt a conventional diesel engine or diesel engine powered electric generator so that it can be operated in either a full diesel fuel mode or a bi-fuel mode, the latter fuel mode being defined by operating with a mixture of a preferably methane based gas and diesel fuel. Transferring between the two fuel modes occurs either automatically or manually while the engine operates continuously and without interruption in output. Additionally, the operation of the diesel engine or diesel engine powered electric generator in the bi-fuel mode results in efficiency levels comparable to those normally exhibited when operating in the full diesel fuel mode.

2. Description of the Related Art

Diesel engines, both large and small, are commonly used articles of machinery employed to supply operating power for a variety of uses. These range from, for example, minor applications such as cars and trucks, home heating, and personal electric power generators, to major applications such as trains, heavy factory equipment, and large electric power generators such as those required to provide power to an entire facility or a power grid within a city. Moreover, it is the capacity of the diesel engine which dictates the output power to be achieved, and thereby dictates its potential uses.

In particular, diesel engine powered electric generators are well known in the art. While many types of electric generators having different power sources are available, including those that operate on hydrodynamic power, solar power, wind power, etc., a primary type of electric generator utilizes one or more diesel engines as the power source which permits the generation of electrical power. These diesel engine powered electric generators are indeed preferred because of the large electrical output which may be obtained. However, as previously indicated, the output of these electric generators is primarily dictated by the capacity of the diesel engines, and, therefore, because in many circumstances a very large electrical output is required, a number of diesel engine powered electric generators are often linked with one another in a parallel system so as to function together to provide the required output. Indeed, this capability is among the benefits of using diesel engine powered electrical generators.

Another significant reason diesel engines are preferred over other types of engines is the relatively lower cost of diesel fuel as compared with other fossil fuels for powering large capacity engines. Of course, however, although the cost is relatively low, there is still a substantial expense associated with powering diesel engines as the fuel consumption can be substantially great over an extended period of time, particularly when utilized to operate large electric generators. For this reason, it would be beneficial to provide a system which can reduce the amount of diesel fuel consumption without deteriorating the capacity of the diesel engine and/or harming or altering the diesel engine so as to hinder its normal operation. In particular, such a system should not require substantial modification and/or replacement of existing diesel engines, but should preferably work in conjunction with the existing models and designs so as to enhance their effectiveness and lessen the amount of diesel fuel to be consumed for a certain required capacity to be obtained.

A further consideration that must be addressed with the diesel engine powered electric generators involves the consistency of the electrical output. In particular, ideal circumstances require that a consistent electrical output level be maintained and/or that sufficient output to correlate with demand be consistently maintained. As a result, conventional systems cannot merely decrease the diesel fuel utilized within the diesel engines without suffering substantial negative effects as to the electrical power output. For example, a conservation type of system wherein lesser quantities of diesel fuel are utilized at certain periods of time will generally prove ineffective and as a result is not used, as such a pattern of operation typically leads to substantial irregularities in electrical power output. Furthermore, most diesel engine powered electric generators operate on a demand system which is truly not capable of working on a lessened diesel fuel supply without risking potentially serious damage to the diesel engine and/or generator themselves. Furthermore, dedicated, spark ignited natural gas generators are typically viewed as being less efficient and more expensive to operate. Accordingly, complete conversion to natural gas powered engines is also not desirable.

For the preceding reasons it would also be beneficial to provide a fuel system which can work in conjunction with existing high capacity diesel engines, but which can replace a portion of the diesel fuel utilized with an alternative, less expensive fuel. Such a system should not entirely remove the need for diesel fuel, but would maintain the output of the diesel engine with lesser quantities of the diesel fuel in order to assure a consistent capacity, based upon engine load, as would normally be obtained with a full diesel fuel operation, however, without the normal fuel consumption. Such a system, because of the potentially volatile nature of alternative fuel sources, should also provide a seamless operation that assures a consistent capacity within the usually accepted, optimal operating environment, and should be capable of detecting any potentially harmful disruptions in normal operation. Also, upon detection of any potentially hazardous conditions, the system should be capable of returning the diesel engine to normal, full diesel fuel operation without downtime or fluctuations in capacity. Further, such a system should be capable of incorporation with diesel engine powered electric generators of varying capacities, including those utilizing multiple diesel engines incorporated as part of a parallel system, without affecting the normal output parameters of those electric generators from when they are operating in their normal full diesel fuel mode. Additionally, such a system should operate without restricting normal air inflow to the engine to assure that engine operating efficiencies are maintained.

SUMMARY OF THE INVENTION

The present invention relates to a bi-fuel control system and retrofit assembly which may preferably be a digital control system and includes the operative components for implementing the system and assembly to modify a conventional, reciprocating diesel engine or diesel engine powered electric generator so that the engine is capable of operation in either a full diesel fuel mode or a bi-fuel mode.

The bi-fuel mode may be more specifically defined as a mode of operation of the diesel engine or generator wherein the engine thereof is fueled by a mixture of a methane based gas and diesel fuel, instead of 100 percent diesel fuel for which the conventional diesel engine or diesel powered electric generator was originally designed. The term methane based gas comprises a variety of gaseous fuels including, but not limited to, methane, propane, butane, natural gas, bio-gas, well head gas, and/or mixtures thereof. The preferred methane based gas is natural gas wherein the bi-fuel mixture comprises a variable mixture of fuel containing from about 40 percent to 90 percent natural gas with the balance representing diesel fuel. The aforementioned percentage of natural gas utilized in the bi-fuel mode of operation more definitively represents the percentage of the ingredient of natural gas as part of the total fuel being consumed when the operation of the engine or generator is in the bi-fuel mode. In addition, the system and assembly of the present invention is specifically designed to be operative with all grades of diesel fuel including but not limited to diesel fuels No. 1, No. 2, No. 3 and heavy-bunker fuel, depending upon the normal capacity of the diesel engine or diesel powered electric generator.

As will be set forth in greater detail hereinafter, the digital bi-fuel control system and retrofit assembly of the present invention allows a conventional diesel engine or diesel engine powered electric generator, of the type set forth above, to automatically operate over the entire range of bi-fuel mixture percentages, including zero percent methane based gas, based on the value or values of any of any one or more pre-determined operating parameters indicative of the diesel engine load monitored during the operation of the diesel engine. Such predetermined, monitored operating parameters may include, by way of example only, engine intake manifold air pressure, gas control valve position, or kilowatt output of the generator.

Yet another factor in the design of the digital bi-fuel control system and retrofit assembly of the present invention is that the engine may be returned to full diesel fuel operation manually by the operator through the provision of a master on/off switch located at a main control panel associated with the unit. Moreover, of primary significance in the design and operation of the system and the retrofit assembly when applied to a diesel engine powered electric generator, is that either automatic or manual transfer between the bi-fuel mode and the full diesel fuel mode results in continuous, un-interrupted diesel engine operation and, therefore, generated electric power output.

The bi-fuel system and retrofit assembly of the present invention includes a gas control sub-system and sub-assembly designed for controlling the amount of methane based gas supplied to the diesel engine while operating in the bi-fuel mode, based on the load to the diesel engine. More specifically, in the illustrated embodiment, the gas control sub-system is designed to utilize a methane based gas having a preferred, predetermined gas supply pressure of between 1 psi and 5 psi. Of course, the ultimate gas pressure and/or flow rate may be varied depending on the system requirements. Furthermore, the functional operation of the gas control sub-system is scalable so that it can be adapted to various sized diesel engines requiring differing air and fuel flow rates. This of course includes engines or engine powered generators with multiple turbochargers and/or superchargers and/or multiple air intakes.

The digital bi-fuel control system and retrofit assembly of the present invention also includes an electronic control sub-system and sub-assembly which is designed to monitor various components of the overall system and further to control certain specific operative parameters of the system and the diesel engine which signify optimal and/or acceptable conditions for operation in the bi-fuel mode, based on the diesel engine load. The electronic control sub-system is further structured to display relevant system data and status which may directly affect the transfer of operation of the engine or generator between the bi-fuel mode and the full diesel fuel mode.

These and other features and advantages of the present invention will become more clear when the drawings as well as the detailed description, are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed towards a bi-fuel control system and retrofit assembly, which is preferably a digital system, and configured for modifying a conventional reciprocating diesel engine or diesel powered electric generator to the extent that the engine or generator can operate in either a full diesel mode of operation, as originally designed and intended, or a bi-fuel mode of operation. The bi-fuel mode of operation is more specifically defined as an operation utilizing a preferably methane based gas and diesel fuel mixture, where the gas is preferably natural gas but may be any methane based gas including, but not limited to, methane, propane, butane, natural gas, bio-gas, well head gas, and/or mixtures thereof. In a preferred embodiment, the gas is supplied in pre-determined amounts based upon the diesel engine load, preferably ranging from 40 percent to 90 percent of the total fuel consumed by the diesel engine or generator when they are operating in the bi-fuel mode. An alternate embodiment provides that the amount of gas supplied is pre-determined based on a kilowatt output level of a diesel powered electric generator.

A performance feature of the digital bi-fuel control system, as well as the retrofit assembly for implementing the system of the present invention, is the ability to either automatically or manually transfer between the bi-fuel mode of operation and the full diesel fuel mode of operation, without any interruption or disruption in the power output of the engine or generator. In addition, the digital bi-fuel control system and retrofit assembly assures engine or generator operation in either the bi-fuel mode or the full diesel fuel mode at substantially equivalent or comparable efficiency levels, however, the diesel fuel consumption is significantly reduced in the bi-fuel mode.

Figure 1:
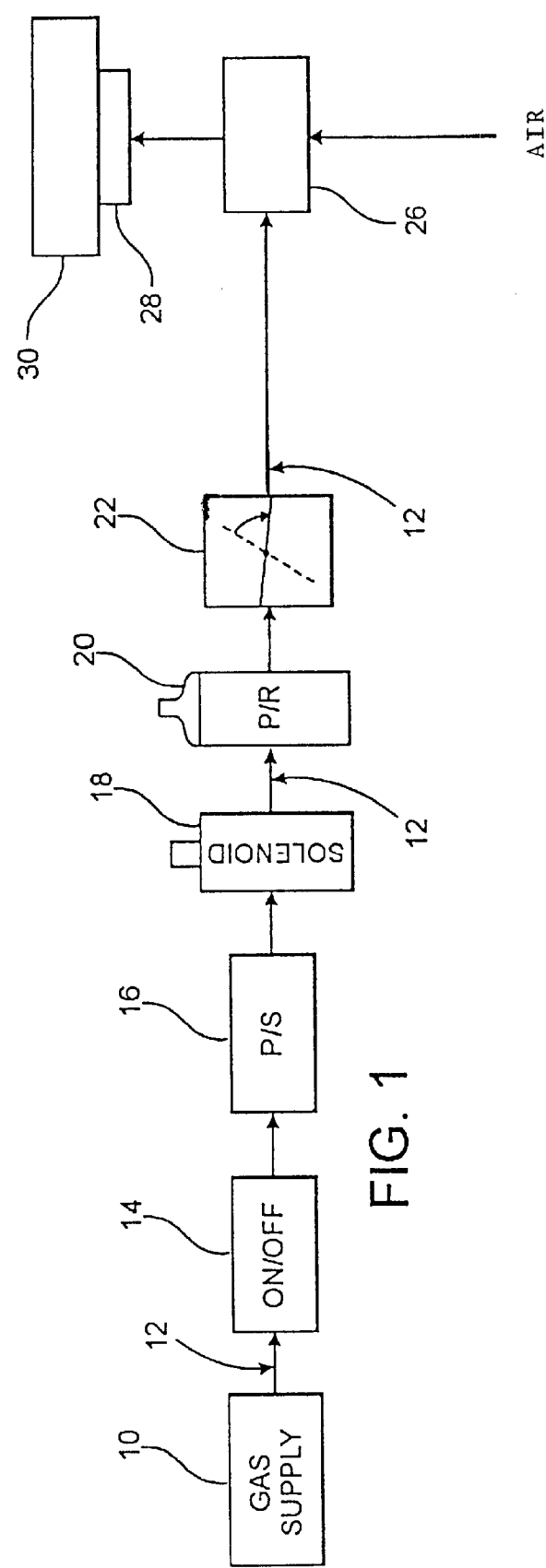
FIG. 1 is a schematic representation of an embodiment of the gas control sub-system and sub-assembly of the present invention.

In accordance with the accompanying Figures the digital bi-fuel control system of the present invention will be explained, at least in part, with specific reference to an associated, operative bi-fuel retrofit assembly including the operative components thereof. The digital bi-fuel control system of the present invention includes two major sub-systems comprising the gas control sub-system and the electronic control sub-system. FIG. 1 relates to the gas control sub-system and more particularly to a gas control sub-assembly and the operative components thereof which serve to implement the sub-system. A supply of methane based gas indicated as 10 is provided at a convenient and conventional location, wherein gas flows along a gas flow path 12 at a predetermined positive pressure of preferably from 1 psi and 5 psi. A shut-off valve 14 is connected in fluid communication to the gas supply 10 and downstream thereof. The shut-off valve 14, which preferably allows manual operation but may also be controlled by a small servo motor, is designed for safety purposes as a positive control device allowing all gas flow along the gas flow path 12 to be stopped in case of an emergency such, as but not limited to gas leaks, fire, etc.

A gas pressure sensor and switch 16 is located along the gas flow path 12 downstream of the shut-off valve 14. The gas pressure sensor and switch 16 is designed and structured to identify the inbound gas pressure, directing the system to automatically transfer to the full diesel fuel mode of operation of the engine by shutting off the inbound gas flow in the event that the gas pressure along the gas fuel path 12 drops below the aforementioned pre-determined positive pressure of between 1 psi and 5 psi. The gas pressure sensor and switch 16 is further structured to have a specified, pre-determined set point and is electrically activated and powered. Furthermore, once gas pressure has been restored to the aforementioned pre-determined pressure level, the gas pressure sensor and switch 16 may direct the system to transfer from the full diesel fuel mode of operation automatically to the bi-fuel mode, such as by actuation of the shut-off valve 14 or preferably by actuation of another valve located in direct association therewith as will be described.

Specifically, an electrically operated solenoid valve 18 is preferably located downstream of the gas pressure sensor and switch 16 and is designed and structured to automatically stop gas flow along the gas flow path 12 to the diesel engine 30, in the event of either a manual or automatic shut down of the digital bi-fuel control system, such as due to the detection of certain critical operating conditions such as insufficient supply gas pressure, or in the case of a shut down of the engine or generator unit as a whole. The gas solenoid valve 18 is structured and disposed to ensure that positive pressure gas flow is stopped prior to reaching the positive pressure gas regulator 20, also disposed along the gas flow path 12, and may indeed be associated with the gas pressure sensor and switch 16.

As indicated, the system includes a positive pressure gas regulator 20, structured to reduce the gas pressure to the engine from its inlet pressure. Located downstream of the gas pressure regulator 20 is a gas control valve 22, which in a preferred embodiment of the present invention, is in the form of a throttle body. The throttle body defines one of the adjustable components of the digital bi-fuel control system and is preferably set or scheduled during the mapping or tuning phase of the engine or generator. Therefore, the gas control valve 22 is preferably an electrically operated throttle body which is positionable between either a maximum open position or a substantially closed position, with a plurality of partially open, fuel regulating positions located therebetween. The partially open position of the gas control valve 22 is adjustable to allow the digital bi-fuel control system to have a separate gas flow adjustment based on diesel engine load levels or diesel powered electric generator kilowatt output levels, which makes the digital bi-fuel control assembly of the present invention more flexible for installation on engines or electric generators which operate over a wide spectrum of load conditions.

In a preferred embodiment, the position of the gas control valve 22 is initially set or scheduled for at least three engine intake manifold air pressure (MAP) levels as determined by an engine intake manifold air pressure sensor and relay control module 24. Based on the initially scheduled gas control valve positions and associated MAP's, the full range of gas control valve positions for each MAP may be determined by the electronic control sub-system and sub-assembly. As the diesel engine load increases into the medium to high range, the gas control valve 22 may be commanded to open to its maximum open position to minimize the restriction of gas flow to the engine along the fuel flow path 12. The preferred embodiment provides adjustability of the gas control valve 22 by, for example, a small servo motor or similar control device integrated so as to provide variable positioning of the gas control valve 22 in order to more precisely match or correspond to desired gas flowrates. This setting can be processor or logic controlled dependant upon the engine output load conditions, as determined from the engine intake manifold air pressure.

In an alternate embodiment of the present invention, the control valve 22 is initially set or scheduled based upon at least three different kilowatt output levels (KOL) of a diesel powered electric generator, as determined by a kilowatt output level indicator and relay control module 34. Similar to the preferred embodiment, the initially set or scheduled gas control valve positions and associated KOL's are utilized to determine the full range of gas control valve positions for each KOL by the electronic control sub-system and sub-assembly. As in the preferred embodiment, the gas control valve 22 is adjustably positionable by, for example, a small servo motor or like control device to permit variable gas control valve 22 settings. The settings can be processor or logic controlled dependant upon the engine output load conditions, as determined from the diesel powered electric generator kilowatt output levels.

It is also beneficial to note that the digital bi-fuel control system and retrofit assembly of the present invention has been specifically designed to utilize air-gas mixing devices which do not incorporate an air throttling plate or any other type of throttling function, thereby not hindering the normal operation and efficiency of the engine. Specifically, by utilizing a positive gas pressure regulator 20 and an air-gas mixing device 26 of the present invention, the digital bi-fuel control system ensures that the basic operating efficiency of the engine or generator will not be negatively impacted by the use or installation of the present invention, especially when operating in the normal full diesel fuel mode. It is further noted that conventional diesel engines do not utilize an air throttling device and thereby avoid "pumping loses" which result in significant efficiency penalties. Thus, the digital bi-fuel control system and assembly of the present invention maintains an efficiency level during operation of the engine or generator in the bi-fuel mode comparable to the efficiency level when operating in the full diesel fuel mode.

After exiting the air-gas mixing device 26, the homogeneous air-gas mixture is then ingested into the engine intake manifold, schematically represented as 28, in a conventional fashion, where it is then distributed to each of the intake valves as per the normal intake air distribution scheme of the diesel engine 30. As each intake valve opens, as per the valve timing scheme of the diesel engine 30, the air-gas mixture is delivered to the cylinder to result in the achievement of required combustion in combination with a decreased quantity of diesel fuel being needed. Furthermore, within such a system the normal operation of the diesel engine 30, and in particular its governor, which determines the amount of fuel being supplied, is not compromised. That is, the engine's governor is normally configured to supply more or less fuel based upon the engine output and/or load requirements. When gas is added utilizing the present invention, the output is naturally increased such that the governor itself will reduce the amount of fuel, which is in the form of bi-fuel, being supplied in a conventional fashion. Indeed, the supply of gas is generally transparent to the normal operation of the engine itself, as the overall engine controls only recognize that less fuel is needed to produce the desired output. Further, when switching back to full diesel fuel mode, the governor merely recognizes that more fuel is needed to maintain the desired output levels, thereby increasing the supply and providing the smooth transition.

Figure 2:
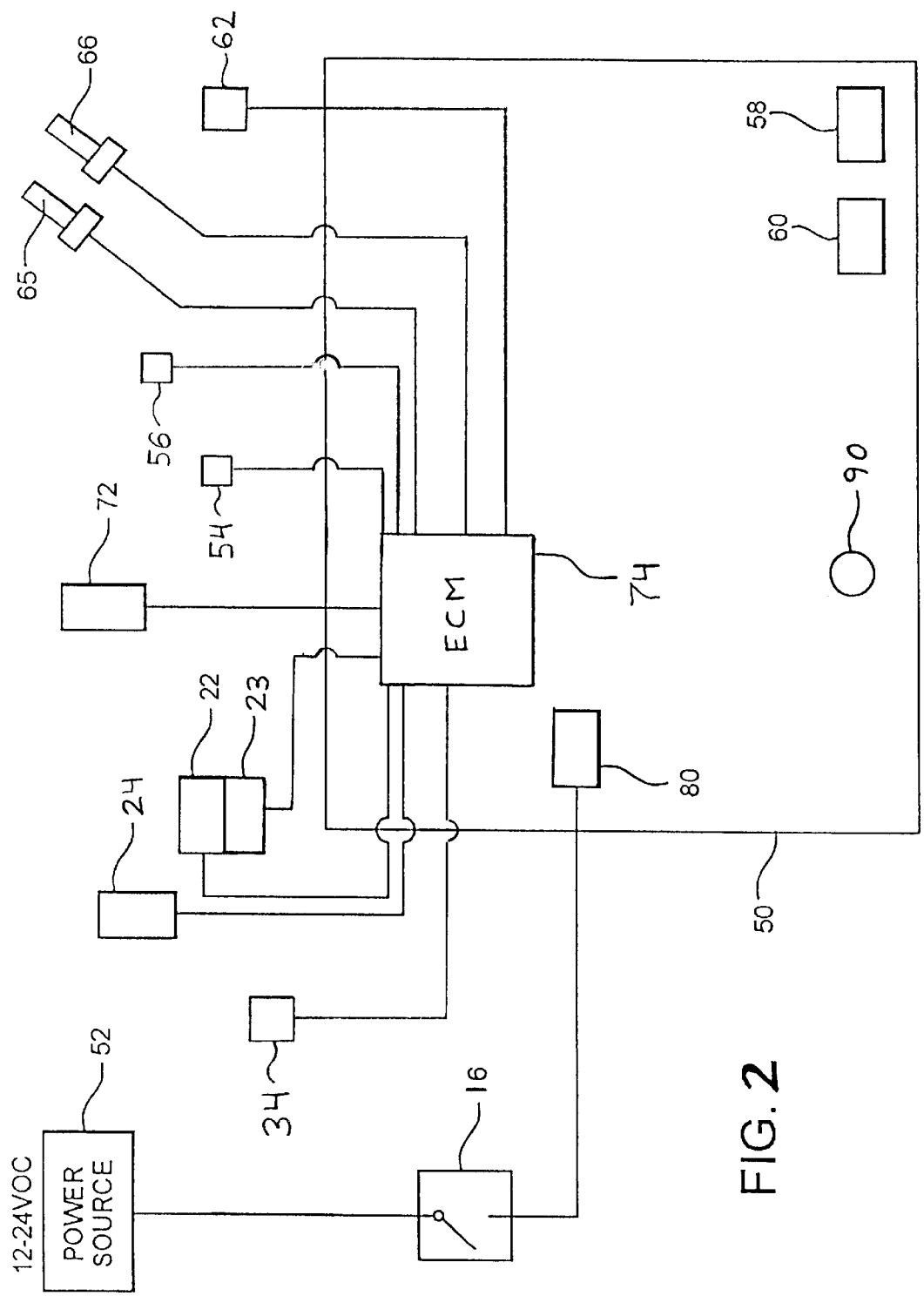
FIG. 2 is a schematic representation of an embodiment of an electronic control sub-system and sub-assembly of the present invention.

With reference to FIG. 2, another feature of the present invention is the inclusion of the electronic control sub-system and sub-assembly which is designed and structured to control the various components of the digital bi-fuel control system. The electronic control sub-system is also designed to monitor and indicate critical and non-critical operating parameters of the diesel engine, including the display of system data, and the detection and display of fault conditions, thereby providing an accurate status of the operation of the system and engine or generator unit as a whole both to an operator and to the overall engine and/or generator control system, thereby automatically preventing potentially harmful operating conditions.

The electronic control sub-system and sub-assembly is preferably powered from the diesel engine 30 or diesel powered electric generator control panel, or starting batteries with a 12–24 volt DC power source 52. Input current flows to the electronic control sub-system and sub-assembly through the gas pressure sensor and switch 16 of the gas control sub-assembly. If the contacts of the gas pressure sensor and switch 16 are in the open position there is an indication of a critical fault condition. With regard to this condition, operation in bi-fuel mode is not desired and the system will only permit operation of the diesel engine in a conventional fashion under full diesel fuel mode. Of course, it is understood that the engine and/or generator control systems may also signal a shut down if other operating parameters are not within tolerable levels for normal operation of the diesel engine under the full diesel fuel mode, which will override the electronic control sub-system and sub-assembly of the present invention. Furthermore, in the case of a critical fault condition, such as low gas pressure, the critical fault condition detected will be displayed on an operator panel 50 by means of appropriate LED or other equivalent display structure, which may also display such information as current system faults, the type of fault detected, and the time of the fault. The operator panel 50 may also include additional displays such as an hour meter 58 for clearly disclosing and tracking the length of operation of the number of hours of operation in the bi-fuel mode. Additionally, an hour meter 60 is included to indicate the length of operation in the full diesel fuel mode of operation. The electronic control sub-system and sub-assembly of the present invention further includes data logging capabilities via a data logging and output device 62 wherein each operational fault condition, time of occurrence, duration, response and other relevant operational data, with regard to each fault condition detected, is logged and may be output by any standard data logging and output device 62 currently in use at the present time.

An Electronic Control Module (ECM) 74 monitors engine load levels via the engine intake manifold air pressure sensor and relay control module 24 or the kilowatt output level indicator and relay control module 34, and determines the correct position of the gas control valve 22 based on the detected engine load level. In the event of a critical fault condition, such as low gas supply pressure, the ECM 74 will shut down the bi-fuel system and restore the engine or generator to full diesel fuel operation. Additionally, the ECM 74 will relay to the operator and the overall control system of the diesel engine or diesel powered electric generator, indicating the particular critical fault detected.

As noted above, the engine load levels may be monitored by the ECM 74 using means such as the engine intake manifold air pressure sensor and relay control module 24 or the kilowatt output level indicator and relay control module 34. The ECM 74 is field programmable having numerous set points which may be programmed by the user to customize the operation of the bi-fuel system for use with any make or model of diesel engine or diesel powered electric generator. Furthermore, the ECM 74 may be programmed to establish each set point as either a critical or a non-critical set point, which determines the response of the ECM 74 in the event of operation beyond the range of any set point. For example, in the event of operation outside the boundary of a critical set point, such as a low gas supply pressure as noted above, the ECM 74 will automatically shut down the bi-fuel system and restore the engine or generator to full diesel fuel operation. The ECM 74 may be further programmed to require that the operator manually reset the ECM 74 via manual reset switch 90 before bi-fuel operation may be resumed. Additionally, the ECM 74 is linked to the overall diesel engine or diesel powered electric generator control system to automatically notify those systems of any critical fault detected by the ECM 74.

Alternatively, in the event of operation outside the boundary of a non-critical set point, such as a variance of engine speed, or excessive engine vibration, the ECM 74 will recalculate a reduced gas flowrate curve based on the initial MAP's or KOL's, and the detected non-critical fault condition. The ECM 74 will then reset the position of the gas control valve 22 based on the recalculated, reduced gas flowrate, and monitor for a predetermined period of time to determine if the non-critical fault condition persists. Following operation with the non-critical fault condition being non-detectable for a predetermined period of time, the ECM 74 may return the system to normal bi-fuel operation. In the event the fault condition persists, the ECM 74 may be programmed to either iterate on the recalculation of consecutive reduced gas flowrates, or the non-critical fault may be deemed a critical fault, should the condition persist following one or more attempts to operate at a reduced gas flowrate.

One such user programable set point is the light load bi-fuel drop out point which sets a minimum tolerance level for engine intake manifold air pressure. Another set point the user can program is the maximum allowable engine MAP during bi-fuel operation in which the user can set a maximum allowable engine load or generator kilowatt output level above which the ECM 74 will deactivate the bi-fuel system. In the alternative, the user can program the ECM 74 to permit bi-fuel operation through full engine load, wherein the system will recalculate the gas to diesel ratio that will allow operation at higher engine loading.

The ECM 74 may also be utilized to monitor a variety of additional diesel engine or diesel powered electric generator operating parameters. One such operating parameter which may be monitored and/or programmed as a set point is a vibration level of the engine, which may be detected by a vibration sensor and relay 54. Excessive vibration of a diesel engine may be indicative of improper combustion resulting in the condition commonly known as "engine knock," which may result in serious damage to the engine if left uncorrected. Thus, the ECM 74 is programable to establish a maximum acceptable level of vibration detected by the vibration sensor and relay 54 as either a critical or non-critical set point, thus assuring that continuous operation with excessive vibration is not permitted. In a similar fashion, the engine speed may be monitored by a sensor and relay 56, and programmed as a set point. Since most diesel engines are designed to operate at essentially a constant speed, for example within plus or minus four percent, variance in the engine speed beyond this range may be indicative of unfavorable operating conditions which may or may not be related to bi-fuel operation.

Another operating parameter which may be monitored and or programmed as a set point by the user is the engine exhaust gas temperature. This temperature may be monitored in a variety of places within the engine or generator, including at each turbo or at each cylinder, and is accomplished through the use of thermocouples, as indicated at 65 and 66, which may be comprised of stainless steel or some such equivalent material. A maximum allowable engine exhaust gas temperature set-point may be programmed by the user as either a critical or non-critical set point. Alternatively, the differential exhaust gas temperature may be monitored. In this situation the ECM 74 continuously compares the exhaust gas temperature at each cylinder and a pre-determined reference temperature, and monitors the difference between the two relative to a pre-set tolerance. As with the engine exhaust gas temperature, the differential exhaust gas temperature may be programmed by the user as either a critical or a non-critical set point.

The ECM 74 may also monitor the engine intake manifold air temperature. This is accomplished through a thermocouple 72 installed in the engine intake manifold. Excessively high diesel engine intake manifold air temperatures present a dangerous situation in which pre-detonation can occur. Once again, the intake manifold air temperature may be programmed by the user as either a critical or a non-critical set point.

The ECM 74 further monitors the position of the gas control valve 22 through position sensor 23. If the position of the gas control valve 22 as indicated by position sensor 23 does not correspond within a predetermined tolerance with the position determined by the ECM 74, based on the initially set or scheduled MAP or KOL values, the ECM 74 may automatically shut down the bi-fuel system.

An additional feature of the ECM 74 of the present invention is the incorporation of data logging and output device 62. The present invention may incorporate any standard programmable data logging and output device 62 to record numerous user selected operational parameters at user specified time intervals. The data logging and output device 62 is also programmable to allow the user to select logging of critical and/or non-critical fault conditions detected, and may further be programmed to log additional data for each fault condition detected including, but not limited to, the time the fault was detected, the duration of the fault condition, and the response of the system to the fault condition. The output function will allow a permanent operational record to be retrieved and retained for each diesel engine or diesel powered electric generator which utilizes the present invention.

A further feature of the digital bi-fuel control system is the incorporation of a master "on-delay" time relay 80 which is used for generator paralleling operations. In the event the modified generator is required to parallel with either one or more generators or with an electric utility grid, the digital bi-fuel control system will delay initiating operation in the bi-fuel mode until such time as the generator has completed the paralleling operation, while operating in the full diesel fuel mode. This "delay" function is adjustable and gives the operator a predetermined range of time, preferably 1–300 seconds to complete the paralleling operation before the bi-fuel mode operation of the generator is automatically initiated. As a result, pre-programmed paralleling operations associated with the diesel generator will not be affected or restricted by the implementation and/or operation of the present system.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A bi-fuel control system for modifying diesel engines so as to be operated either in a full diesel fuel mode or a bi-fuel mode, at substantially equivalent operating efficiencies, said system comprising:
   a) a gas control sub-system structured to control an amount of gas supplied to the diesel engine while being operated in the bi-fuel mode;
   b) an electronic control sub-system structured to regulate operation of pre-determined components of said gas control sub-system;
   c) said gas control sub-system and said electronic control sub-system being cooperatively disposed with one another to achieve a change of operation of the diesel engine between the full diesel fuel mode and the bi-fuel mode without engine output being interrupted; and
   d) said gas control sub-system further structured to determine the amount of gas supplied to the diesel engine in response to the load requirements of the diesel engine and independently from a governor of the diesel engine.

2. The control system recited in claim 1 wherein said electronic control sub-system is further structured to determine engine load requirements through the monitoring of engine intake manifold air pressure.

3. The control system as in claim 2 wherein said change of operation between the bi-fuel mode and the full diesel fuel mode is accomplished automatically.

4. The control system as in claim 2 wherein said change of operation between the bi-fuel mode and the full diesel fuel mode is accomplished manually.

5. The control system as in claim 2 wherein the operation in the bi-fuel mode is at least partially defined by operation at a predetermined mixture of gas and diesel fuel.

6. The control system as recited in claim 5 wherein said amount of gas supplied to the diesel engine for operation in the bi-fuel mode is generally between about 40 percent and 90 percent of the total fuel consumed during operation in the bi-fuel mode.

7. The control system as recited in claim 2 wherein said gas control sub-system is structured to provide a manually adjustable flow of gas from a gas supply under a predetermined positive gas supply pressure.

8. The control system as recited in claim 7 wherein the predetermined positive gas supply pressure is generally between about 1 psi and 5 psi.

9. The control system as recited in claim 2 wherein said gas control sub-system is further structured to stop gas flow to the diesel engine during the bi-fuel mode in the event of a system shut down.

10. The control system as recited in claim 2 wherein said gas control sub-system is further structured to stop gas flow to the diesel engine during the bi-fuel mode in the event of a shut down of the diesel engine.

11. The control system as recited in claim 2 wherein said gas control sub-system is structured to stop gas flow to the diesel engine at an isolated location structured to prevent gas flow from reaching the diesel engine during a period of operation in the full diesel fuel mode.

12. The control system as recited in claim 2 wherein said gas control sub-system is programmable so as to achieve a plurality of gas flow rates for scalable operation over a wide spectrum of diesel engine load levels.

13. The control system as recited in claim 2 wherein said gas control sub-system is further structured to mix engine intake air and said gas upstream of the diesel engine intake manifold without requiring an air throttling function.

14. The control system as recited in claim 2 wherein said electronic control sub-system is further structured to monitor and display predetermined operating parameters of said gas control sub-system and the diesel engine.

15. The control system as recited in claim 14 wherein said electronic control system is further structured to cause a stoppage of operation in the bi-fuel mode upon an indication of low gas pressure.

16. The control system as recited in claim 14 wherein said electronic control sub-system is further structured to automatically cease operation in the bi-fuel mode and initiate operation in the full diesel fuel mode upon an indication of operation outside the boundary of a critical set point.

17. The control system as recited in claim 16 wherein said electronic control sub-system is structured to be manually adjustable to set an exhaust gas temperature as said critical set point.

18. The control system as recited in claim 16 wherein said electronic control sub-system is structured to independently monitor an exhaust gas temperature of each exhaust of an engine having a dual exhaust system.

19. The control system as recited in claim 14 wherein said electronic control sub-system is further structured to permit a resumption of operation in the bi-fuel mode, subsequent to automatically ceased operation, only upon manual reset subsequent to a monitored display of the predetermined operating parameters of the gas control sub-system and the diesel engine within a predetermined acceptable range.

20. The control system as recited in claim 14 wherein said electronic control sub-system further includes an adjustable time delay function structured to allow short duration generator load deviations to be ignored and thereby prevent unnecessary on-off cycling of the operation between the bi-fuel mode and the full diesel fuel mode.

21. The control system as recited in claim 2 further comprising a master time delay structured to delay initiation of operation in the bi-fuel mode for an adjustable, pre-set time period so as to accommodate paralleling operations with one or more additional generators or an electric utility grid.

22. The control system recited in claim 1 wherein said electronic control sub-system is further structured to determine engine load requirements through the monitoring of electric generator kilowatt output level.

23. A digital bi-fuel control assembly structured to modify a diesel engine so as to achieve operation thereof in either a full diesel fuel mode or a bi-fuel mode at comparable operating efficiencies, said control assembly comprising:
  a) a gas control sub-assembly structured to control the amount of gas supplied to the diesel engine during operation in said bi-fuel mode,
  b) an electronic control sub-assembly structured to at least partially regulate operation of said gas control sub-assembly,
  c) said gas control sub-assembly and said electronic control sub-assembly being cooperatively structured to provide both automatic and manual transfer of operation of the diesel engine between said full diesel fuel mode and said bi-fuel mode without disruption of engine output, and
  d) said gas control sub-assembly further structured to operate independently from a governor of the diesel engine, and to determine the amount of gas to be supplied to the diesel engine in response to a load requirement of the diesel engine.

24. A control assembly as recited in claim 23 wherein said electronic control sub-assembly is further structured to determine said load requirement from an engine intake manifold air pressure measured at the diesel engine intake manifold.

25. A control as recited in claim 24 wherein said engine intake manifold air pressure is measured by an engine intake manifold air pressure sensor.

26. A control assembly as recited in claim 25 wherein said electronic control sub-assembly is further structured to monitor predetermined engine parameters and display system data to a user.

27. A control assembly as recited in claim 26 wherein said electronic control sub-assembly further comprises a gas pressure sensor and switch structured to automatically stop a gas flow upon a detection of a predetermined low gas pressure and thereby cease operation in said bi-fuel mode.

28. A control assembly as recited in claim 27 wherein said electronic control sub-assembly further comprises an engine exhaust gas temperature monitor and is structured to automatically cease operation in said bi-fuel mode and begin operation in said full diesel fuel mode upon the engine exhaust gas temperature exceeding a predetermined temperature.

29. A control assembly as recited in claim 28 wherein said electronic control sub-assembly comprises a manual reset switch structured to transfer operation from said full diesel fuel mode to said bi-fuel mode upon a monitored indication of the engine exhaust gas temperature within a predetermined acceptable level.

30. A control assembly as recited in claim 29 further comprising an adjustable time delay structured to prevent switching between said bi-fuel mode and said full diesel fuel mode as a result of short duration generator load deviations thereby preventing unnecessary on-off cycling between said bi-fuel mode and said full diesel fuel mode.

31. A control assembly as recited in claim 25 further comprising a master time relay structured to automatically delay initiation of operation in said bi-fuel mode for a predetermined time period until the generator operating in said full diesel fuel mode has completed paralleling functions.

32. A control assembly as recited in claim 24 wherein said gas control sub-assembly is structured to further determine the amount of gas to be supplied to the diesel engine based upon a predetermined gas and diesel fuel ratio parameter set for operation of the engine in said bi-fuel mode.

33. A control assembly as recited in claim 32 wherein said predetermined ratio parameter includes the gas comprising generally about 40 percent to 90 percent of the total fuel consumed during operation in said bi-fuel mode.

34. An assembly as recited in claim 33 wherein said gas control sub-assembly comprises a main shut-off valve disposed to regulate gas flow under positive pressure from a gas supply.

35. An assembly as recited in claim 34 wherein said gas control sub-assembly further comprises a gas pressure sensor and switch disposed down stream of said main shut-off valve and structured to initiate a transfer of operation from said bi-fuel mode to said full diesel fuel mode when the gas pressure drops below a predetermined pressure, and to initiate an automatic transfer of operation back to said bi-fuel mode upon restoration of the gas pressure to at least said predetermined pressure.

36. A control assembly as recited in claim 35 wherein said gas control sub-assembly further comprises a solenoid valve disposed down stream of said gas pressure sensor and switch and structured to automatically stop gas flow to the diesel engine upon shut down of the control assembly or the diesel engine.

37. A control assembly as recited in claim 36 wherein said solenoid valve is disposed and structured to ensure stoppage of positive pressure gas flow to the diesel engine.

38. A control assembly as recited in claim 36 wherein said gas control sub-assembly further comprises a gas pressure regulator disposed down stream of said solenoid valve and structured to reduce positive gas pressure to the diesel engine.

39. A control assembly as recited in claim 38 wherein said gas control sub-assembly further comprises a gas control valve located down stream of said gas pressure regulator and structured to control gas flow dependent on the diesel engine load.

40. A control assembly as recited in claim 39 wherein said gas control valve comprises a throttle body structured to assume a substantially fully open position during heavy diesel engine load demand and a partially open position during light diesel engine load demand.

41. A control assembly as recited in claim 39 wherein said gas control valve is adjustably positionable into a plurality of orientations.

42. A control assembly as recited in claim 39 wherein said gas control sub-assembly further comprises an air-gas mixing device located in fluid communication with the gas flow, down stream of said gas control valve and up stream of the diesel engine intake manifold, said air-gas mixing device further disposed and structured to funnel all incoming air therethrough prior to reaching the diesel engine intake manifold.

43. A control assembly as recited in claim 39 wherein said electronic control sub-assembly is structured to monitor an actual position of said gas control valve and determine if said actual position is within a predetermined tolerance of a position determined by said electronic control sub-assembly, and to shut said gas control valve upon a deviation in said actual position beyond said predetermined tolerance.

44. A control system recited in claim 23 wherein said electronic control sub-system is further structured to determine engine load requirements through the monitoring of electric generator kilowatt output level.

45. A digital bi-fuel control assembly structured to modify a diesel engine so as to be operable in either a bi-fuel mode or a full diesel fuel mode at comparable operating efficiencies, said control assembly comprising:

a) a gas control sub-assembly structured to control the amount of gas supplied to a diesel engine during operation in said bi-fuel mode, b) an electronic control sub-assembly structured to at least partially regulate operation of said gas control sub-assembly, c) said gas control sub-assembly and said electronic control sub-assembly being cooperatively structured to provide both automatic and manual transfer of operation of the engine between said full diesel fuel mode and said bi-fuel mode without disruption of output, and d) said electronic control sub-assembly further including an engine intake manifold air pressure sensor disposed in operative proximity with the diesel engine intake manifold and structured to measure an engine intake manifold air pressure which is utilized to determine a required gas flow rate.

46. A control assembly as recited in claim 45 wherein said required gas flow rate is based on a predetermined table including said required gas flow rate at each engine intake manifold air pressure level.

47. A control assembly as recited in claim 46 wherein said electronic control sub-assembly is further structured to recalculate said predetermined table based upon detection of an operational parameter outside of the boundary of a non-critical set point, wherein said gas flow rate is subsequently based on said recalculated table.

48. A control assembly as recited in claim 46 further comprising a master time delay structured to delay initiation of operation in said bi-fuel mode for an adjustable, pre-set time period to accommodate paralleling operations with one or more additional diesel engines.

49. A control assembly as recited in claim 48 further comprising a data logging and output device structured to store and retrieve user selected operational data and to output said operational data selected to be retained.

50. A control assembly as recited in claim 45 wherein said gas control sub-assembly further comprises a positive pressure gas regulator.

51. A control assembly as recited in claim 50 wherein said gas control sub-assembly includes a gas control valve; said gas control valve further comprising a throttle body adjustably positionable into a plurality of orientations between a maximum open orientation to a substantially fully closed orientation.

52. A control assembly as recited in claim 50 wherein said gas control sub-assembly is structured to permit an amount of gas supplied to the diesel engine to be determined in response to a load requirement of the diesel engine.

53. A digital bi-fuel control system for modifying diesel engines so as to be operated either in a full diesel fuel mode or a bi-fuel mode, at substantially equivalent operating efficiencies, said control system comprising:

a) a gas control sub-system structured to control the amount of gas supplied to the diesel engine while being operated in the bi-fuel mode, b) an electronic control sub-system structured to regulate operation of pre-determined components of said gas control sub-system, c) said gas control sub-system and said electronic control sub-system being cooperatively structured to provide both automatic and manual changes of operation of the diesel engine between the full diesel fuel mode and the bi-fuel mode without disruption of output, and d) said electronic control sub-assembly further including an engine intake manifold air pressure sensor disposed in operative proximity the diesel engine intake manifold and structured to measure an engine intake manifold air pressure, said electronic control sub-assembly structured to utilize said measured engine intake manifold air pressure to determine a required gas flow rate.

54. A control system as recited in claim 53 wherein said electronic control sub-system is further structured to cease operation in the bi-fuel mode upon a monitored indication that an actual throttle position is not within a predetermined tolerance determined by said electronic control sub-system for the throttle position.

55. A control system as recited in claim 53 wherein said electronic control sub-system is further structured to include an adjustable time delay function allowing short duration engine load deviations to be ignored and thereby preventing unnecessary cycling between operation in the bi-fuel mode and the full diesel fuel mode.

56. A control system as recited in claim 55 further comprising a master time delay structured to delay initiation of operation in the bi-fuel mode for an adjustable, pre-set time period to accommodate paralleling operations with one or more additional diesel engines.

57. A control system as recited in claim 53 wherein said gas control sub-system is structured to permit regulation of the amount of gas supplied to the diesel engine in response to the load requirements of the diesel engine.

* * * * *